No. 772,182. PATENTED OCT. 11, 1904.
J. SCRIMGEOUR, Jr. & J. OBERDORFER.
EGG SCOOP.
APPLICATION FILED MAR. 26, 1904.
NO MODEL.
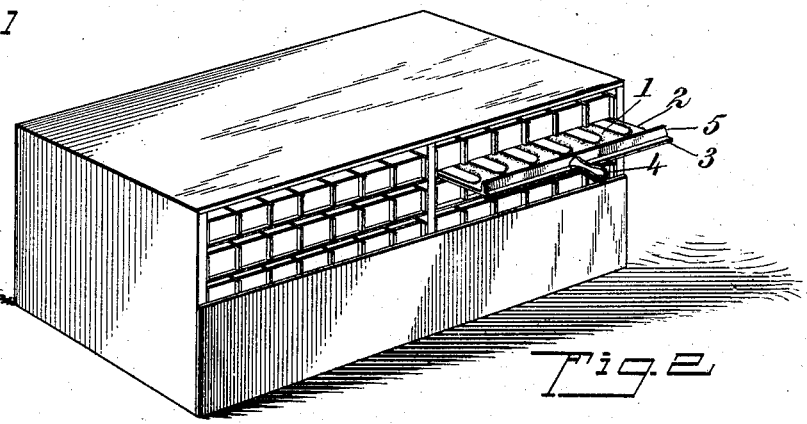
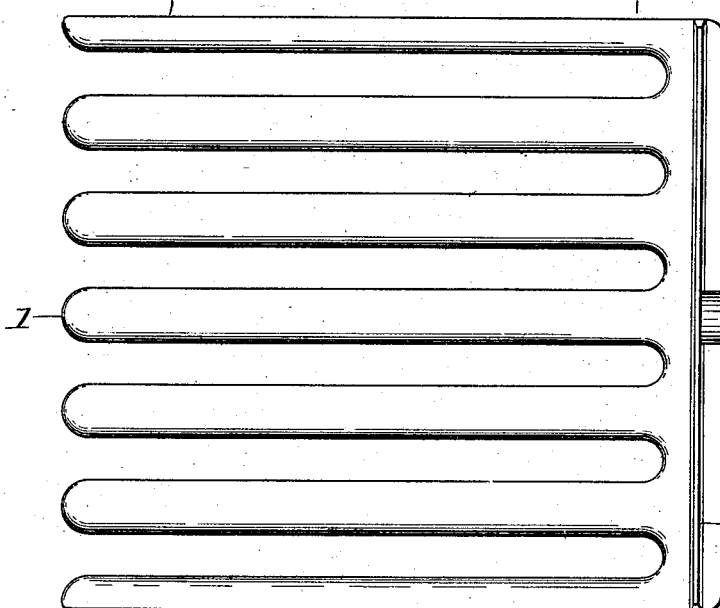
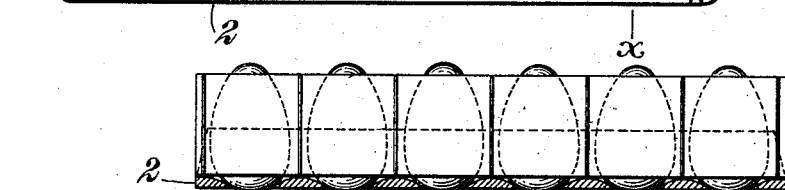
WITNESSES:
INVENTORS
John Scrimgeour Jr.
John Oberdorfer
BY
ATTORNEYS No. 772,182.

Patented October 11, 1904.

UNITED STATES PATENT OFFICE.

JOHN SCRIMGEOUR, JR., AND JOHN OBERDORFER, OF PITTSTON, PENNSYLVANIA.

EGG-SCOOP.

SPECIFICATION forming part of Letters Patent No. 772,182, dated October 11, 1904.

Application filed March 26, 1904. Serial No. 200,129. (No model.)

*To all whom it may concern:*

Be it known that we, JOHN SCRIMGEOUR, Jr., and JOHN OBERDORFER, both citizens of the United States, and residents of Pittston, in the county of Luzerne and State of Pennsylvania, have invented a new and Improved Egg-Scoop, of which the following is a full, clear, and exact description.

This invention relates to improvements in scoops for transferring eggs from a crate to an egg-tester and from the tester back to the crate, the object being to provide a scoop of simple and inexpensive construction and by means of which the eggs may be readily removed in layers from a crate without danger of breaking the eggs.

We will describe an egg-scoop embodying our invention and then point out the novel features in the appended claims.

Reference is to be had to the accompanying drawings, forming a part of this specification, in which similar characters of reference indicate corresponding parts in all the figures.

Figure 1 is a perspective view of an egg-crate, showing a scoop embodying our invention as partly inserted. Fig. 2 is an edge view of the scoop. Fig. 3 is a plan view thereof, and Fig. 4 is a section on the line $x$ $x$ of Fig. 3.

The scoop, which consists of any suitable metal—such, for instance, as aluminium or iron— comprises a plurality of spaced prongs 1, which are arranged between outer prongs 2, and the several prongs extend from a cross-bar 3, provided with a handle 4 and having an upright flange 5 to limit the inward movement of the scoop. The prongs 1 are rounded on the upper side from edge to edge, so that they will pass with very little friction between the eggs and engage with the same at the sides of the large ends, as clearly indicated in Fig. 4. The outer prongs 2, however, are only half-rounded on the upper side—that is, they are rounded from the outer edge to the inner edge—the outer edges being flat, so as to engage with the vertical walls of the crate.

In the operation the scoop is to be slid underneath the layer of eggs while in the crate and then the eggs are to be drawn out with the scoop and also with the cardboard partitions. As the tines engage with the eggs laterally of their vertical axes, the eggs will be prevented from tilting laterally. It will be noted that the under sides of the several tines are perfectly flat, so that they will slide readily upon the horizontal partitions between layers of eggs.

Having thus described our invention, we claim as new and desire to secure by Letters Patent—

1. An egg-scoop comprising a plurality of spaced tines transversely rounded on their upper surfaces and flat on their under sides.

2. An egg-scoop comprising a plurality of spaced tines rounded on their upper surfaces from edge to edge, the outer tines having flat outer edges and rounded from said edges to the inner edges, a cross-bar from which the several tines extend, and a handle on the cross-bar.

3. An egg-scoop comprising a plurality of spaced tines rounded on their upper surfaces from edge to edge and flat on their under surfaces, a cross-bar from which the tines extend, a handle attached to the cross-bar, and an upwardly-extended flange on the cross-bar.

In testimony whereof we have signed our names to this specification in the presence of two subscribing witnesses.

JOHN SCRIMGEOUR, JR.
JOHN OBERDORFER.

Witnesses:
PATK. O. SAMMON,
A. J. BARBER.